United States Patent
Nishiyama et al.

(10) Patent No.: US 12,194,811 B2
(45) Date of Patent: Jan. 14, 2025

(54) AIR CONDITIONING SYSTEM FOR VEHICLE

(71) Applicant: TOYOTA JIDOSHA KABUSHIKI KAISHA, Aichi-ken (JP)

(72) Inventors: Masahiro Nishiyama, Toyota (JP); Takashi Kubokura, Toyota (JP); Masashi Hotta, Nagoya (JP); Shunsuke Shigeta, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 222 days.

(21) Appl. No.: 18/062,581

(22) Filed: Dec. 7, 2022

(65) Prior Publication Data
US 2023/0182533 A1   Jun. 15, 2023

(30) Foreign Application Priority Data
Dec. 10, 2021   (JP) .................. 2021-200735

(51) Int. Cl.
*B60H 1/00* (2006.01)

(52) U.S. Cl.
CPC ..... *B60H 1/00878* (2013.01); *B60H 1/00285* (2013.01); *B60H 1/00292* (2013.01)

(58) Field of Classification Search
CPC ............ B60H 1/00878; B60H 1/00292; B60H 1/00778; B60H 1/00657; B60H 1/00285
See application file for complete search history.

(56) References Cited

U.S. PATENT DOCUMENTS

| | | | |
|---|---|---|---|
| 2009/0133417 A1 | 5/2009 | Egawa | |
| 2009/0193825 A1 | 8/2009 | Hara | |
| 2010/0176110 A1* | 7/2010 | Ogino | B60H 1/2225 |
| | | | 219/202 |
| 2013/0131919 A1* | 5/2013 | Pan | B60H 1/3208 |
| | | | 701/36 |
| 2015/0343882 A1* | 12/2015 | Satzger | B60H 1/00007 |
| | | | 165/202 |
| 2017/0080779 A1* | 3/2017 | Sagou | B60H 1/2215 |

FOREIGN PATENT DOCUMENTS

| | | |
|---|---|---|
| JP | H06-082086 A | 3/1994 |
| JP | H08-219530 A | 8/1996 |
| JP | 2004-256092 A | 9/2004 |
| JP | 2007-069657 A | 3/2007 |
| JP | 200755315 A | 3/2007 |
| JP | 2017-185920 A | 10/2017 |

* cited by examiner

*Primary Examiner* — Marc E Norman
(74) *Attorney, Agent, or Firm* — HAUPTMAN HAM, LLP

(57) ABSTRACT

An air conditioning system for a vehicle that air conditions a vehicle cabin before a user gets into a vehicle, in which the air conditioning system strongly air conditions the vehicle cabin by increasing an air conditioning output for a predetermined period after the user gets into the vehicle.

6 Claims, 11 Drawing Sheets

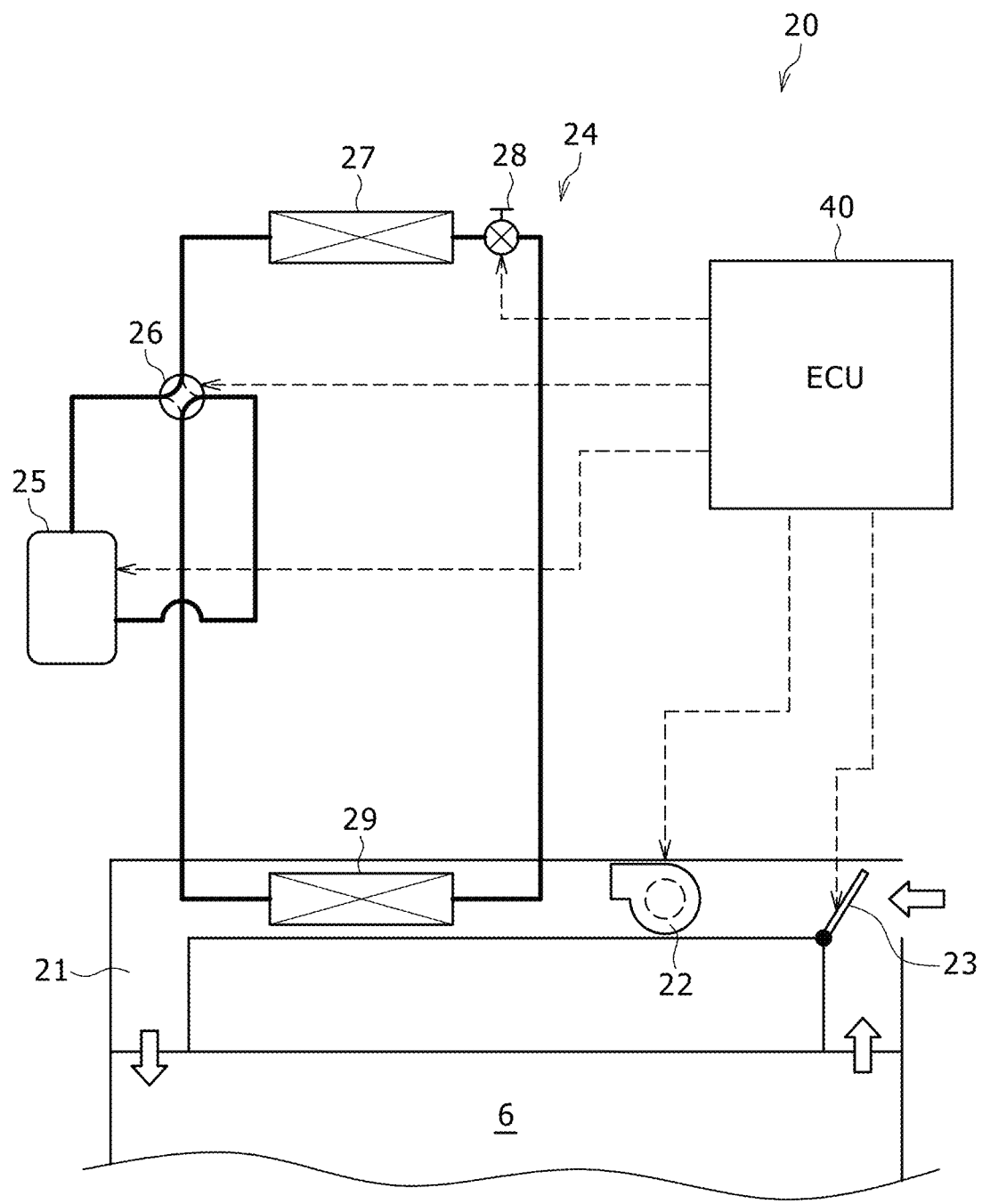
F I G. 3

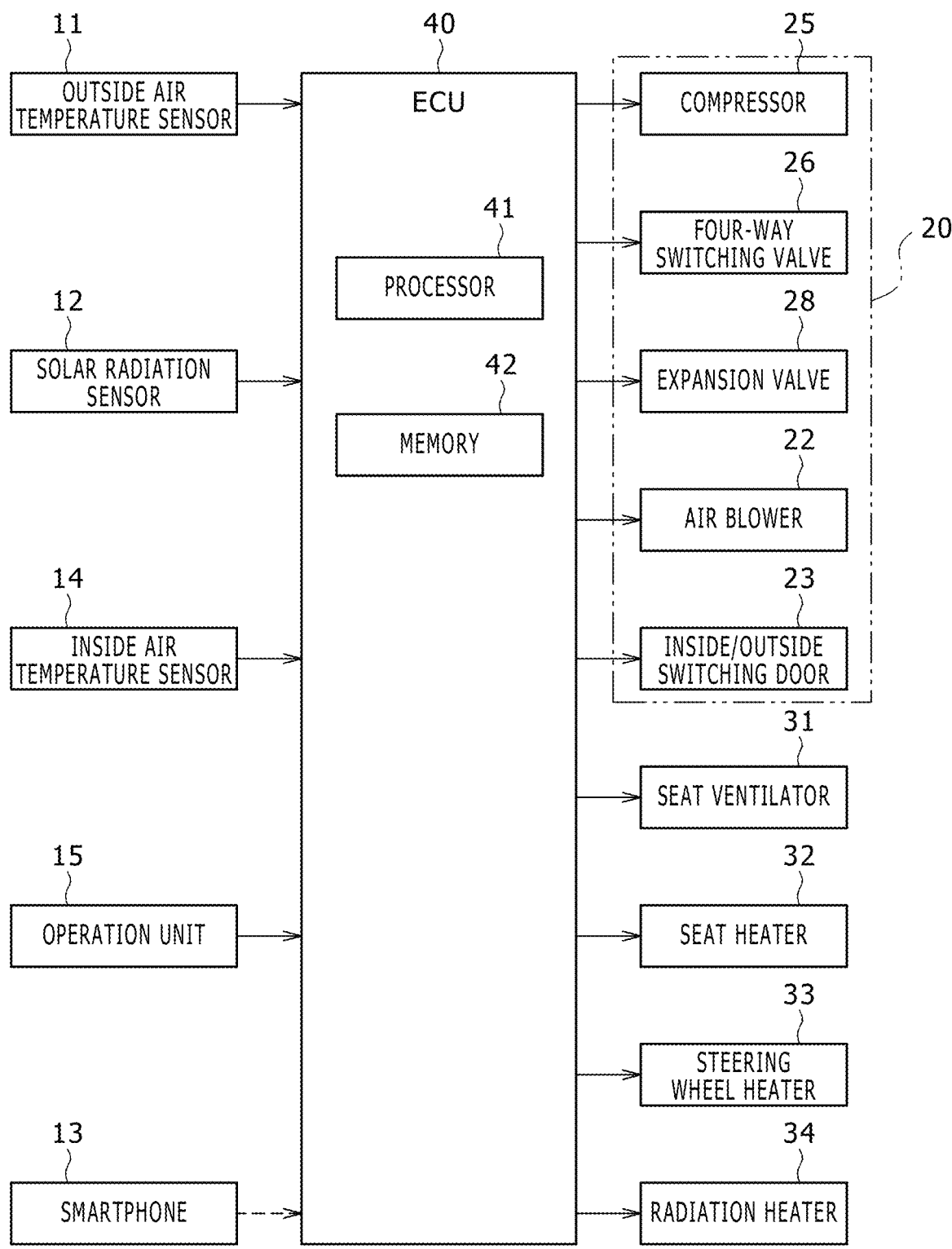
F I G . 4

AIR CONDITIONING SYSTEM FOR VEHICLE

CROSS REFERENCE TO RELATED APPLICATION

This application claims priority to Japanese Patent Application No. 2021-200735 filed on Dec. 10, 2021, which is incorporated herein by reference in its entirety including the specification, claims, drawings, and abstract.

TECHNICAL FIELD

This disclosure relates to an air conditioning system for a vehicle that air conditions a vehicle cabin before a user gets into a vehicle.

BACKGROUND

In an air conditioning system for a vehicle, a user sometimes air conditions a vehicle cabin before getting into a vehicle. JP 2007-055315 A discloses a technique of air conditioning a vehicle cabin before a user gets into a vehicle in summer, and blowing out cool air that has pooled in a lower portion of the vehicle cabin toward an upper portion of the vehicle cabin to send cool air to the user and give the user a sense of comfort.

SUMMARY OF THE INVENTION

Meanwhile, in summer, the user sometimes gets into the vehicle with the body or clothes of the user containing heat. In this case, just blowing out cool air that has pooled in the lower portion of the vehicle cabin toward the upper portion of the vehicle cabin is sometimes not enough for the user to feel cool. Accordingly, air conditioning control after the end of the air conditioning before riding in the vehicle still leaves room for improvement.

Thus, it is an advantage of this disclosure to provide an air conditioning system for a vehicle that is capable of improving the comfort of the user while riding in the vehicle after the air conditioning before riding in the vehicle is over.

An air conditioning system for a vehicle according to this disclosure is an air conditioning system for a vehicle that air conditions a vehicle cabin before a user gets into a vehicle, the air conditioning system being characterized in that the air conditioning system strongly air conditions the vehicle cabin by increasing an air conditioning output for a predetermined period after the user gets into the vehicle.

In this way, by increasing the air conditioning output for the predetermined period after the user gets into the vehicle, it is possible to send the vehicle cabin cool air with a large air volume flow in summer and warm air with a large air volume flow in winter.

In the air conditioning system for a vehicle according to this disclosure, the air conditioning system preferably includes an outside air temperature sensor, and strongly air conditions the vehicle cabin by increasing the air conditioning output for the predetermined period after riding in the vehicle when an outside air temperature detected by the outside air temperature sensor is as high as a first predetermined temperature or higher, or when the outside air temperature is as low as a second predetermined temperature or lower.

In this way, by increasing the air conditioning output for the predetermined period when the outside air temperature is as high as the first predetermined temperature or higher, or when the outside air temperature is as low as the second predetermined temperature or lower, comfortable air conditioning control can be implemented.

In the air conditioning system for a vehicle according to this disclosure, the amount of the air conditioning output to be increased is preferably determined according to the outside air temperature.

In this way, by determining the amount of the air conditioning output to be increased according to the outside air temperature, it is possible to send the vehicle cabin more cool air with a large air volume flow in midsummer and more warm air with a large air volume flow in midwinter.

In the air conditioning system for a vehicle according to this disclosure, the predetermined period is preferably determined according to the outside air temperature.

In this way, by determining the predetermined period according to the outside air temperature, it is possible to send a large volume flow of vehicle cabin cool air at the height of summer, and a large volume flow of warm air in the middle of winter, for an optimum period of time.

In the air conditioning system for a vehicle according to this disclosure, the air conditioning system preferably includes a solar radiation sensor, and the predetermined period is determined according to the amount of solar radiation detected by the solar radiation sensor.

In this way, by determining the predetermined period according to the amount of solar radiation, it is possible to send a large air volume flow of vehicle cabin cool air for an optimum period of time if the amount of solar radiation is large, even when the outside air temperature is not so high in summer.

The air conditioning system for a vehicle according to this disclosure includes an auxiliary air conditioner including: a seat ventilator that blows air to the user who sits on a seat; a seat heater that heats the seat; a steering wheel heater that heats a steering wheel; and a radiation heater that radiates radiation heat in the vehicle cabin, and strongly air conditions the vehicle cabin by increasing the air conditioning output for the predetermined period after the user gets into the vehicle.

According to the air conditioning system for a vehicle of this disclosure, it is possible to improve the comfort of the user during riding on the vehicle after the air conditioning before riding on the vehicle is over.

BRIEF DESCRIPTION OF DRAWINGS

An embodiment of this disclosure will be described based on the following figures, wherein:

FIG. 3 is a schematic diagram illustrating an air conditioner;

FIG. 4 is a block diagram illustrating a configuration of the vehicular air conditioning system;

DESCRIPTION OF EMBODIMENTS

Hereinbelow, an example of an embodiment of this disclosure will be described in detail. In the following description, specific shapes, materials, directions, numeric values, and the like are examples for facilitating understanding of this disclosure, and may be changed as appropriate according to the use, advantage, specifications, and the like.

<Vehicle>

Using FIG. 1, a description will be given of a vehicle 5 equipped with a vehicular air conditioning system 10 which is the example of the embodiment.

Figure 1:
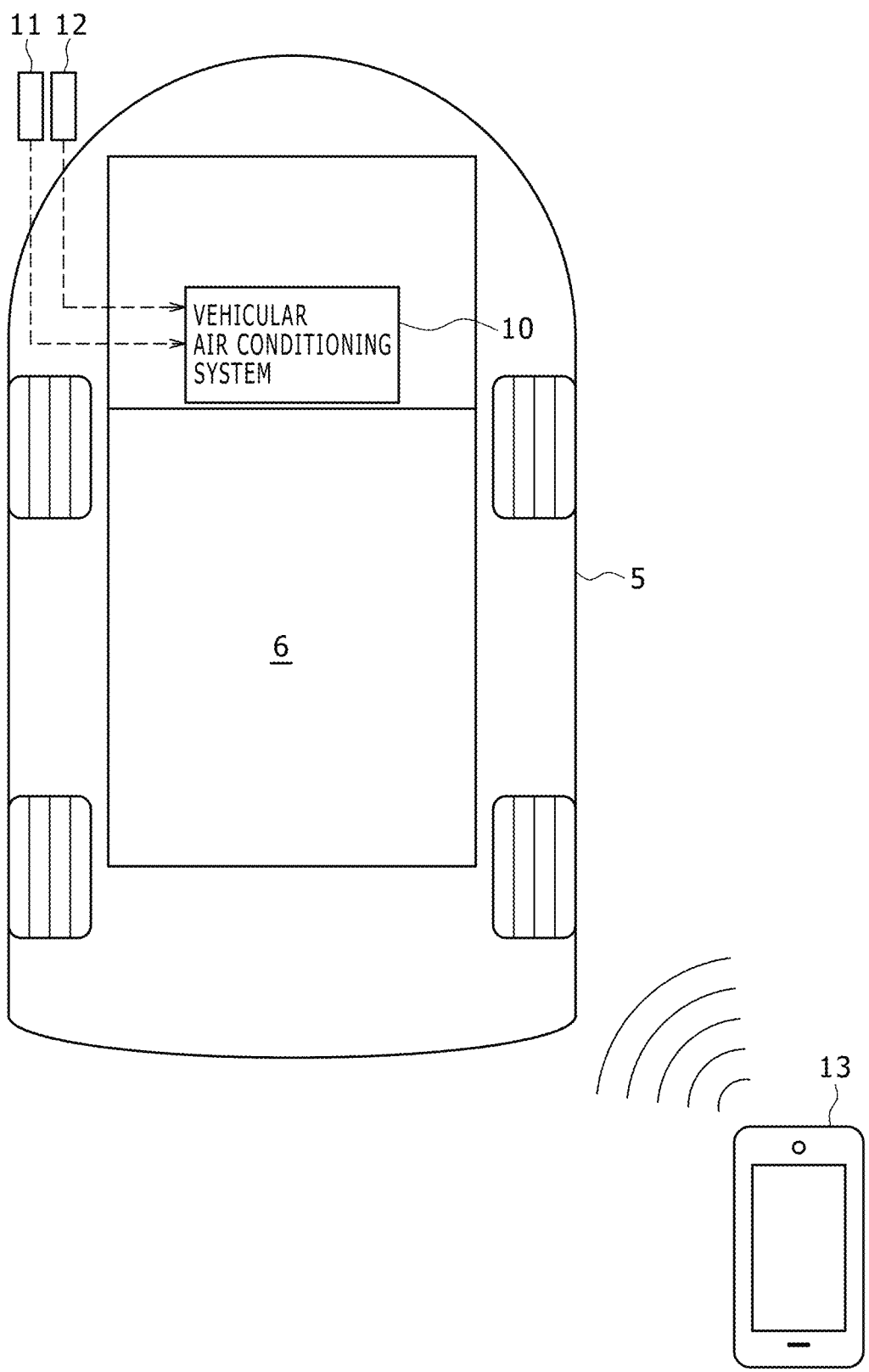
FIG. 1 is a schematic diagram illustrating a vehicle equipped with an air conditioning system for a vehicle (hereinafter, also referred to as "vehicular air conditioning system") which is an example of the embodiment.

As illustrated in FIG. 1, the vehicle 5 is an electric vehicle that drives a motor using electric power supplied from a battery and travels with the motor as its power. Note that the vehicle 5 is not limited to this embodiment and may be a hybrid vehicle or an engine vehicle.

The vehicle 5 includes: the vehicular air conditioning system 10 that air conditions a vehicle cabin 6; an outside air temperature sensor 11 that detects an outside air temperature outside the vehicle; and a solar radiation sensor 12 that detects the amount of solar radiation outside the vehicle. A user starts the vehicular air conditioning system 10 of the vehicle 5 through remote control by a smartphone 13 in order to air condition the vehicle cabin 6 before the user gets into the vehicle 5 (hereinafter referred to as pre-air conditioning).

<Vehicular Air Conditioning System>

Using FIG. 2, a description will be given of the vehicular air conditioning system 10 which is the example of the embodiment.

Figure 2:
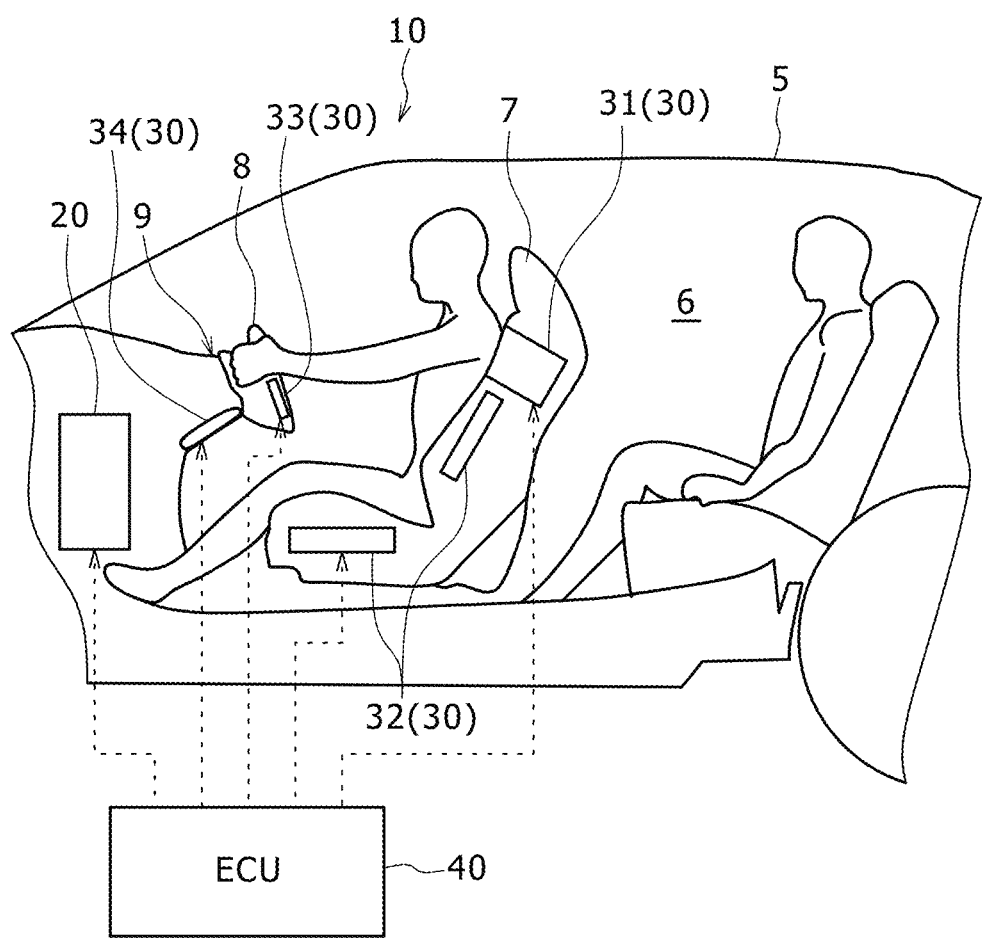
FIG. 2 is a schematic diagram illustrating the vehicular air conditioning system which is the example of the embodiment.

As illustrated in FIG. 2, the vehicular air conditioning system 10 includes: an air conditioner 20 that air conditions the vehicle cabin 6; and an auxiliary air conditioner 30 that supplementarily air conditions the periphery of the user. The auxiliary air conditioner 30 includes: a seat ventilator 31; a seat heater 32; a steering wheel heater 33; a radiation heater 34; and an electronic control unit (ECU) 40 that controls these devices, each of which will be described later. The air conditioner 20 and the ECU 40 will be described in detail later.

The seat ventilator 31 is a cooler that blows air to the user who sits on a seat 7. The seat ventilator 31 is provided in a rear portion of the seat 7. The seat ventilator 31 may be capable of switching an air blowing volume flow between three phases.

The seat heater 32 is a heater that heats the seat 7 by generating heat through energization. The seat heater 32 is provided in a seat surface portion and the rear portion of the seat 7. The seat heater 32 may be capable of adjusting heat output between three phases.

The steering wheel heater 33 is a heater that heats a steering wheel 8 by generating heat through energization. The steering wheel heater 33 is provided in the steering wheel 8. The steering wheel heater 33 may be capable of adjusting heat output between three phases.

The radiation heater 34 is a heater that radiates radiation heat in the vehicle cabin 6 by generating heat through energization. The radiation heater 34 is provided in a bottom surface of a steering column 9. However, without being limited to this embodiment, the radiation heater may be provided in an interior member such as an instrument panel, a door trim, and a ceiling. The radiation heater 34 may be capable of adjusting heat output between three phases.

<Air Conditioner>

Using FIG. 3, a description will be given of the air conditioner 20.

As illustrated in FIG. 3, the air conditioner 20 includes: an air passage 21 through which to feed temperature conditioned air into the vehicle cabin 6; an air blower 22 that generates an airflow toward the vehicle cabin 6; an inside/outside switching door 23 that switches air to be introduced between air inside the vehicle cabin 6 (inside air) and air outside the vehicle 5 (outside air); and a refrigerant cycle 24 that will be described later.

The refrigerant cycle 24 is constituted by: a compressor 25 that compresses refrigerant; a four-way switching valve 26 that switches the operation between cooler and heater modes; an outside heat exchanger 27 that is disposed in a front portion of a vehicle body; an expansion valve 28 that expands the refrigerant; and an inside heat exchanger 29 that is disposed in the air passage 21, with these components being connected.

<ECU>

Using FIGS. 4 to 7, a description will be given of the ECU 40.

As described previously, the ECU 40 controls the devices constituting the vehicular air conditioning system 10. The ECU 40 includes: a processor 41 that has a CPU; and a memory 42 that stores therein control programs, control data, and the like. The memory 42 is, for example, RAM, ROM, flash memory and the like. The processor 41 controls the devices of the vehicular air conditioning system 10 by operating according to the control programs stored in the memory 42.

As illustrated in FIG. 4, the ECU 40 is connected to the outside air temperature sensor 11, the solar radiation sensor 12, an inside air temperature sensor 14, an operation unit 15 through which a setting temperature in the vehicle cabin 6 and the like are input, the air blower 22, the inside/outside switching door 23, the compressor 25, the four-way switching valve 26, the expansion valve 28, the seat ventilator 31, the seat heater 32, the steering wheel heater 33, and the radiation heater 34, and is wirelessly connected to the smartphone 13.

Upon receiving detection signals from the outside air temperature sensor 11, the solar radiation sensor 12, and the inside air temperature sensor 14, or upon receiving a command signal from the smartphone 13, the ECU 40 sends control signals to the air blower 22, the inside/outside switching door 23, the compressor 25, the four-way switching valve 26, the expansion valve 28, the seat ventilator 31, the seat heater 32, the steering wheel heater 33, and the radiation heater 34.

The processor 41 calculates a target blowout port temperature, a target air volume flow, and a target inside/outside air switching door opening amount based on an outside air temperature detected by the outside air temperature sensor 11, an inside air temperature detected by the inside air temperature sensor 14, the amount of solar radiation detected by the solar radiation sensor 12, and the setting temperature set by the operation unit 15.

The processor 41 adjusts the compressor 25, the four-way switching valve 26, the expansion valve 28, the opening amount of the inside/outside switching door 23, the air volume flow of the air blower 22, and the like so as to achieve the target blowout port temperature, the target air volume flow, and the target inside/outside air switching door opening amount thus calculated.

The processor 41 pre-air conditions the vehicle cabin 6 before the user gets into the vehicle 5 by starting the vehicular air conditioning system 10 through remote control by the smartphone 13. In addition, the processor 41 ends the pre-air conditioning when the user gets into the vehicle 5. Whether the user gets into the vehicle 5 may be detected by a seating sensor or whether a door is opened or closed. Without being limited to this embodiment, the pre-air conditioning may be ended when a predetermined period elapses since the start of the pre-air conditioning, or when a predetermined amount of power or more is consumed.

When ending the pre-air conditioning after the user gets into the vehicle 5, the processor 41 strongly air conditions the vehicle cabin 6 for a "predetermined period (hereinafter referred to as an output increase period)" by increasing an "air conditioning output" of the vehicular air conditioning system 10. In this way, by increasing the air conditioning output for the output increase period after the user gets into the vehicle, it is possible to send a large air flow of cool air into the vehicle cabin 6 in summer, and a large air flow of warm air in winter.

During cooling, the processor 41 cools down the vehicle cabin 6 by increasing the air conditioning output for the output increase period when an outside air temperature is as high as a first predetermined temperature T1, or higher. Specifically, in an example illustrated in FIG. 5, the processor 41 cools the vehicle cabin 6 by increasing the air conditioning output for the output increase period when the outside air temperature is 30 degrees Celsius or higher. Meanwhile, during heating, the processor 41 warms up the vehicle cabin 6 by increasing the air conditioning output for the output increase period when the outside air temperature is as low as a second predetermined temperature T2, or lower. Specifically, in the example illustrated in FIG. 5, the processor 41 warms up the vehicle cabin 6 by increasing the air conditioning output for the output increase period when the outside air temperature is 10 degrees Celsius or lower. In this way, by increasing the air conditioning output for the output increase period only when the outside air temperature is any of the first predetermined temperature or higher and the second predetermined temperature or lower, comfortable air conditioning control can be implemented.

<Air Conditioning Output>

The air conditioning output of the vehicular air conditioning system 10 includes the amount of circulation of refrigerant and the air blowing volume flow of the air conditioner 20, i.e., includes the target blowout port temperature and the target air volume flow which are their targets. Increasing the air conditioning output means air conditioning the vehicle cabin 6 during cooling by reducing the target blowout port temperature and increasing the target air volume flow for the output increase period, and air conditioning the vehicle cabin 6 during heating by increasing the target blowout port temperature and increasing the target air volume flow for the output increase period.

Figure 5:
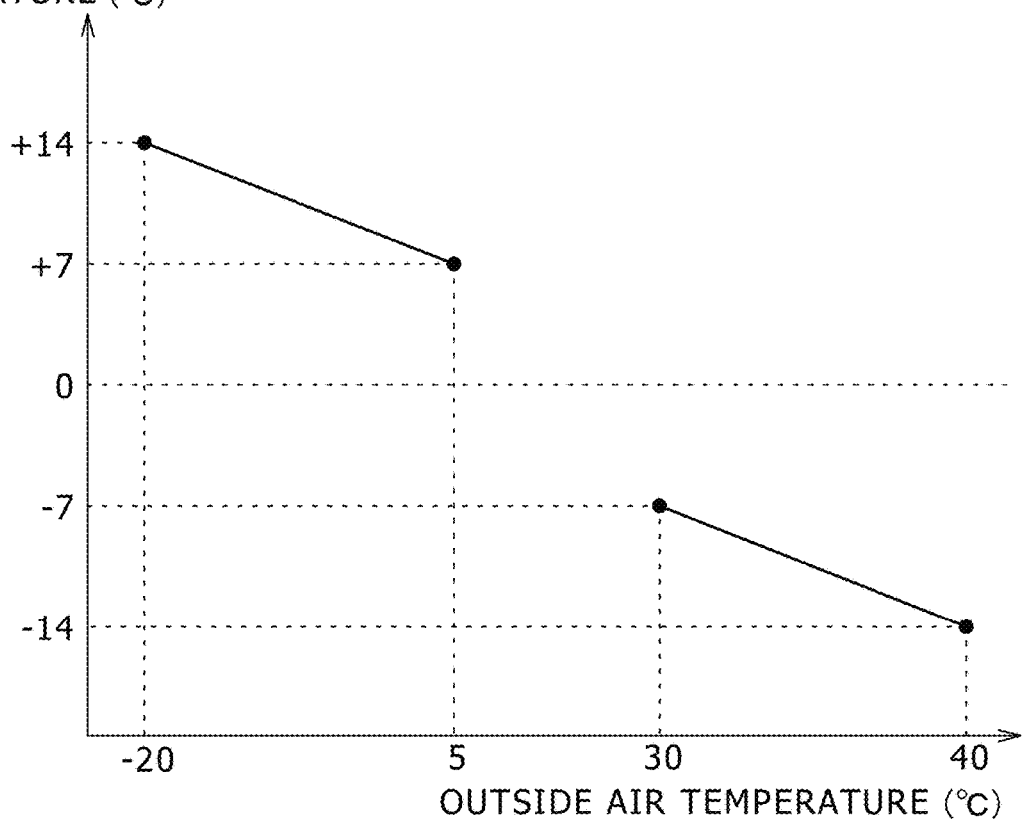
FIG. 5 is a graph illustrating a relationship between an outside air temperature and a correction value of a target blowout port temperature.

As illustrated in FIG. 5, the amount of air conditioning output to be increased is determined according to an outside air temperature. Specifically, the amount of reduction of the target blowout port temperature during cooling (correction value) is reduced as the outside air temperature increases. In the example illustrated in FIG. 5, the correction value is reduced gradually in such a way as to be reduced by 7 degrees Celsius when the outside air temperature is 30 degrees Celsius and reduced by 14 degrees Celsius when the outside air temperature is 40 degrees Celsius. Meanwhile, the amount of increase of the target blowout port temperature during heating (correction value) is increased as the outside air temperature decreases. In the example illustrated in FIG. 5, the correction value is increased gradually in such a way as to be increased by 7 degrees Celsius when the outside air temperature is 5 degrees Celsius and increased by 14 degrees Celsius when the outside air temperature is minus 20 degrees Celsius. In addition, the air volume flow during cooling may be increased as the outside air temperature increases. Likewise, the air volume flow during heating may be increased as the outside air temperature decreases.

In this way, by determining the target blowout port temperature to be increased or reduced according to the outside air temperature, it is possible to send the vehicle cabin 6 more cool air with a large air volume flow in the middle of summer, and more warm air with a large air volume flow in the middle of winter.

Further, the air conditioning output of the vehicular air conditioning system 10 at least includes: an air volume flow of the seat ventilator 31 of the auxiliary air conditioner 30; and outputs of the seat heater 32, the steering wheel heater 33, and the radiation heater 34. Specifically, the vehicular air conditioning system 10 air conditions the vehicle cabin 6 during cooling by increasing the air volume flow of the seat ventilator 31 for the output increase period, and air conditions the vehicle cabin 6 during heating by increasing the outputs of the seat heater 32, the steering wheel heater 33, and the radiation heater 34 for the output increase period.

Note that when the output of the auxiliary air conditioner 30 is determined according to the target blowout port temperature, the output of the auxiliary air conditioner 30 may be determined according to the target blowout port temperature increased or reduced. Alternatively, the vehicle cabin 6 may be air conditioned by setting the outputs of all the constituents of the auxiliary air conditioner 30 uniformly at the maximum level for the output increase period.

<Output Increase Period>

Figure 6:
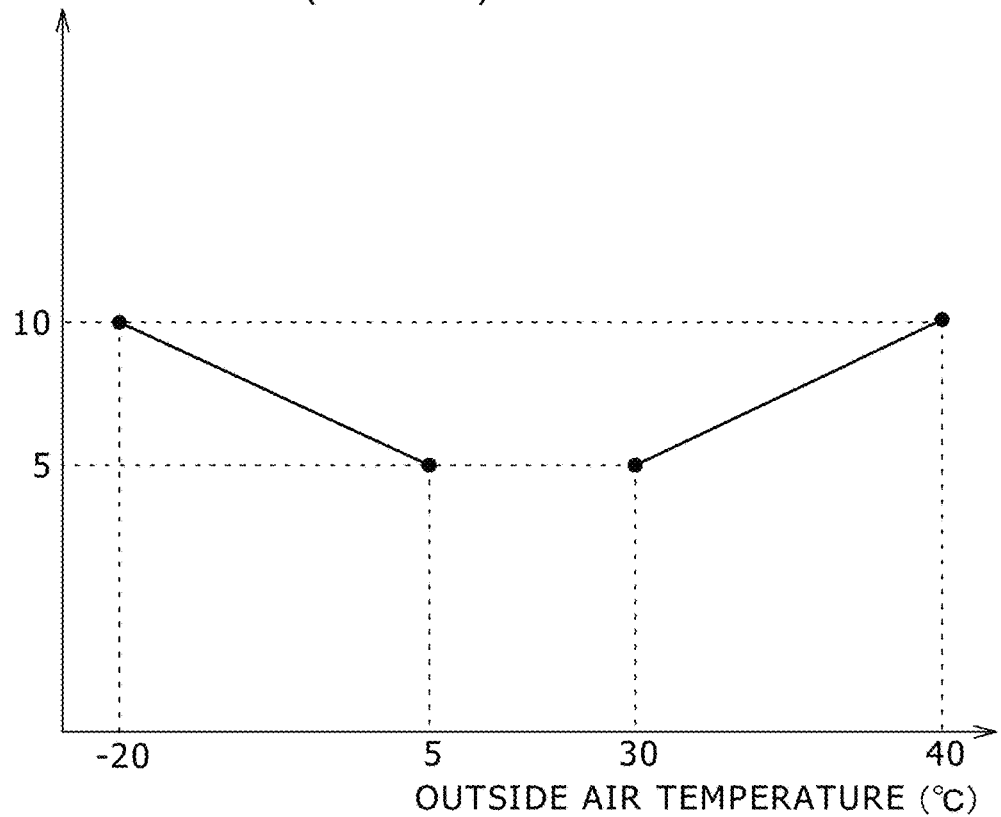
FIG. 6 is a graph illustrating a relationship between the outside air temperature and an output increase period.

As illustrated in FIG. 6, the output increase period is determined according to an outside air temperature. More specifically, the output increase period during cooling is set to be increased as the outside air temperature increases. In an example illustrated in FIG. 6, the output increase period is set to be increased gradually in such a way as to be increased by 5 minutes when the outside air temperature is 30 degrees Celsius, and increased by 10 minutes when the outside air temperature is 40 degrees Celsius. Meanwhile, the output increase period during heating is set to be increased as the outside air temperature decreases. In the example illustrated in FIG. 6, the output increase period is set to be increased gradually in such a way as to be increased by 5 minutes when the outside air temperature is 5 degrees Celsius, and increased by 10 minutes when the outside air temperature is minus 20 degrees Celsius.

In this way, by determining the output increase period according to the outside air temperature, it is possible to send the vehicle cabin 6 cool air with a large air volume flow in the middle of summer and warm air with a large air volume flow in the middle of winter for an optimum period of time.

Figure 7:
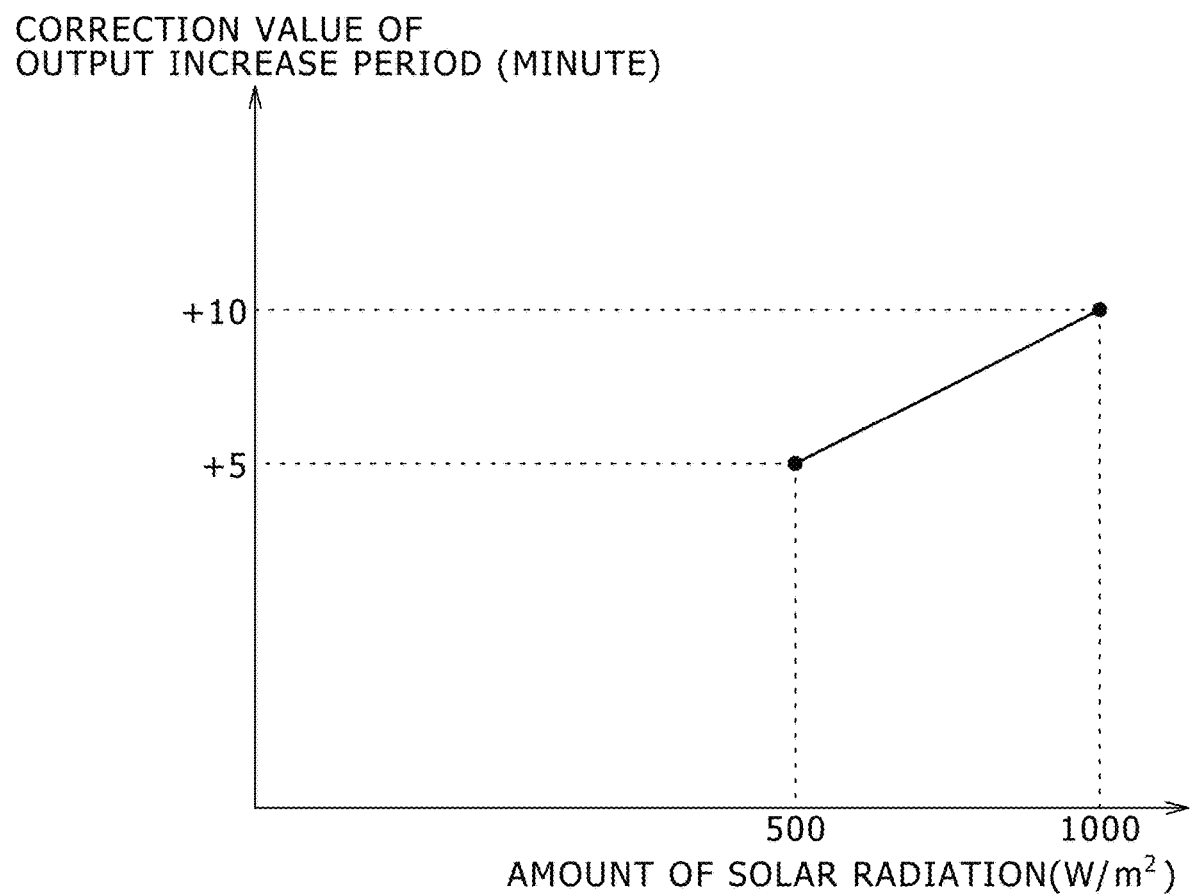
FIG. 7 is a graph illustrating a relationship between the amount of solar radiation and a correction value of the output increase period.

As illustrated in FIG. 7, the output increase period is corrected according to the amount of solar radiation. More specifically, the output increase period during cooling is corrected to be increased as the amount of solar radiation increases. In an example illustrated in FIG. 7, the output increase period is set to be increased gradually in such a way as to be increased by 5 minutes when the amount of solar radiation is 500 W/m², and increased by 10 minutes when the amount of solar radiation is 1000 W/m². In this way, by correcting the output increase period according to the amount of solar radiation, it is possible to send the vehicle cabin 6 cool air with a large air volume flow for an optimum period of time if the amount of solar radiation is large, even when an outside air temperature is not so high.

<Operation of Vehicular Air Conditioning System>

Figure 8:
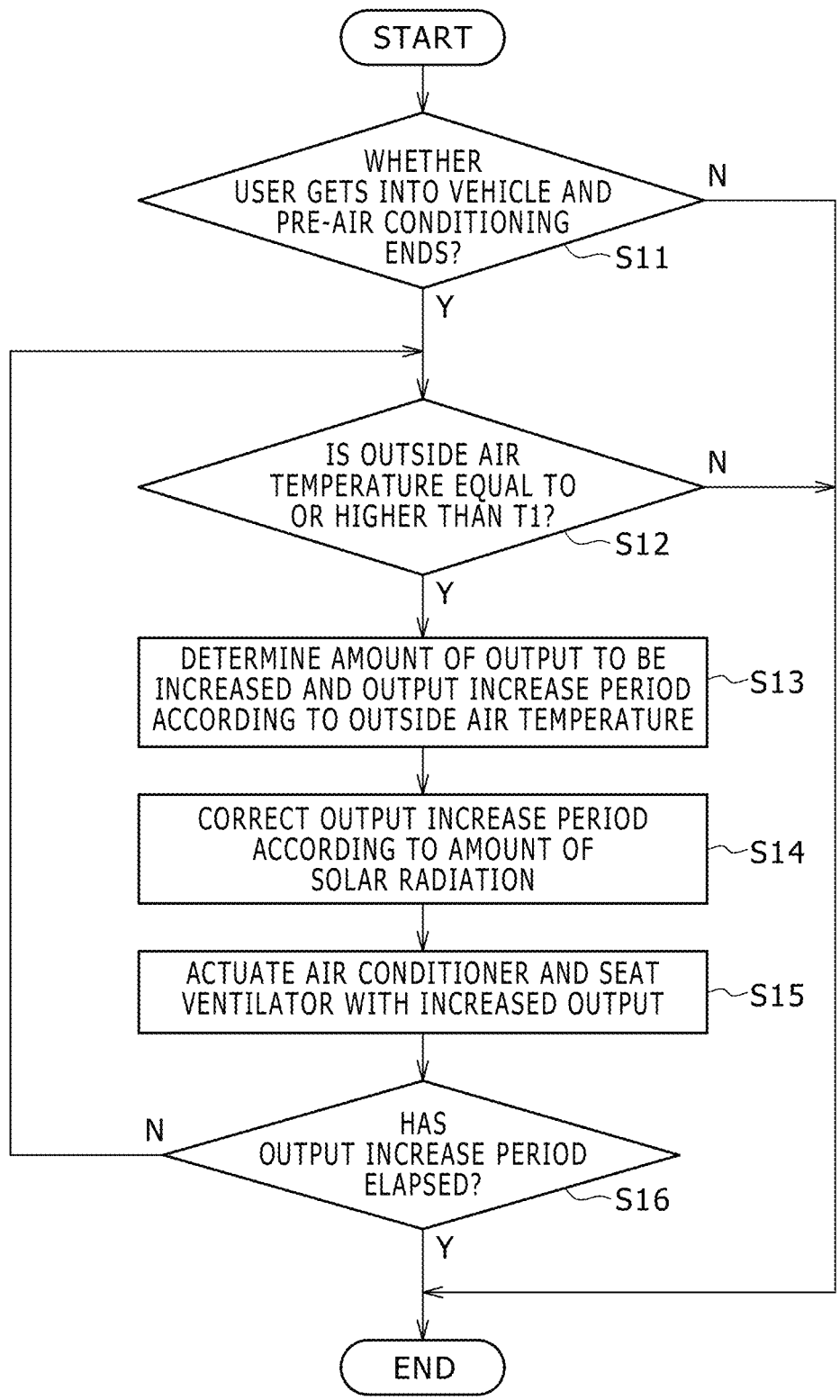
FIG. 8 is a flowchart illustrating an operation flow of the vehicular air conditioning system during cooling.
Figure 9:
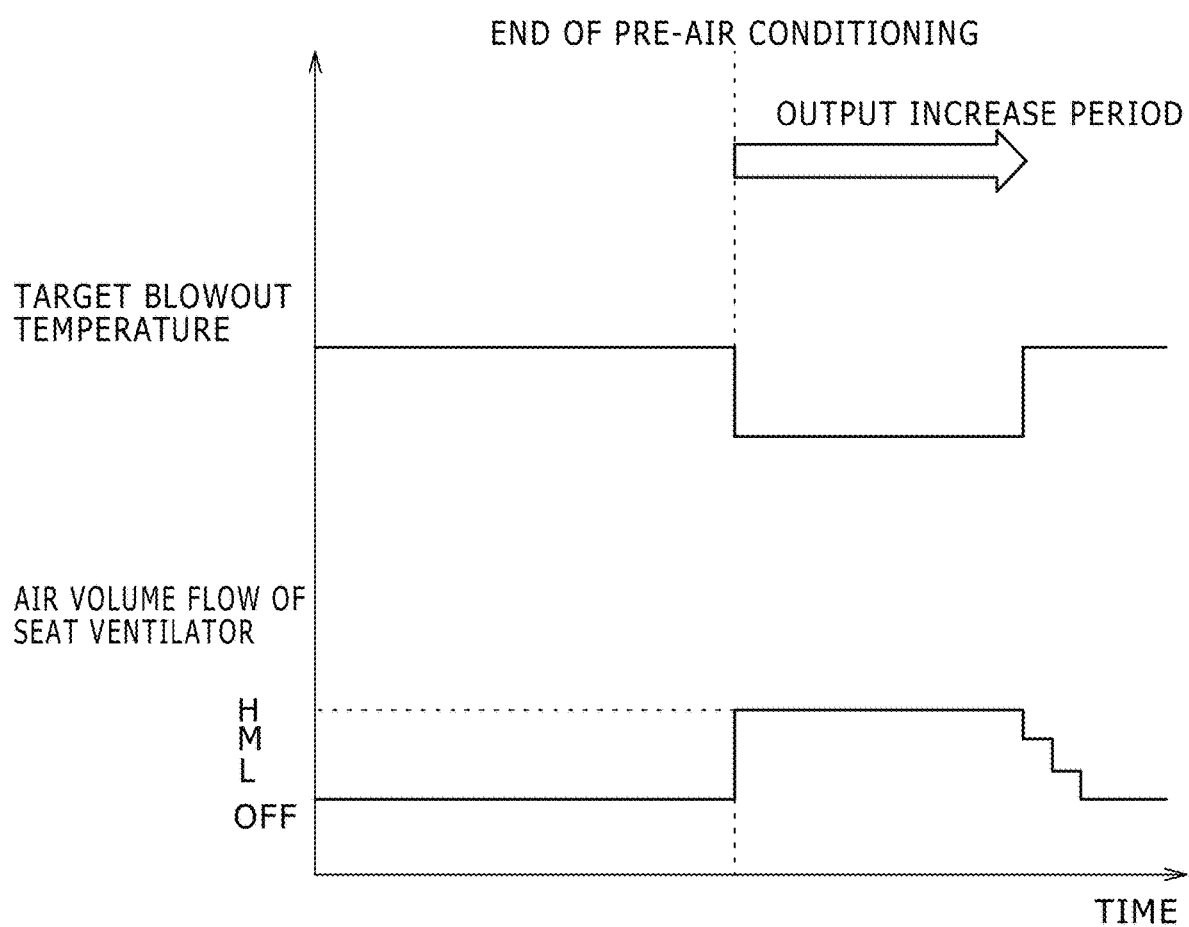
FIG. 9 is a time chart illustrating the operation flow of the vehicular air conditioning system during cooling.

Using FIGS. 8 and 9, a description will be given of an operation flow of the vehicular air conditioning system 10 during cooling.

In Step S11, the processor 41 checks whether the user gets into the vehicle 5 and the pre-air conditioning ends. When the pre-air conditioning ends, the process proceeds to Step S12. In Step S12, the processor acquires an outside air temperature from the outside air temperature sensor 11, and checks whether the outside air temperature is equal to or higher than the first predetermined temperature T1. When the outside air temperature is equal to or higher than the first predetermined temperature T1, the process proceeds to Step S13.

In Step S13, the processor determines the amount of output to be increased, and the output increase period, according to the outside air temperature. In Step S14, the processor acquires the amount of solar radiation from the solar radiation sensor 12, and corrects the output increase period determined in Step S13 according to the amount of solar radiation.

In Step S15, the processor air conditions the vehicle cabin 6 by actuating the air conditioner 20 and the seat ventilator 31 with an output to which the amount of output to be increased has been added. The output of the seat ventilator 31 may be set at the maximum level. In Step S16, when the output increase period elapses after the pre-air conditioning ends, the processor transitions to normal air conditioning control. The output of the seat ventilator 31 may be reduced in a stepwise fashion.

Figure 10:
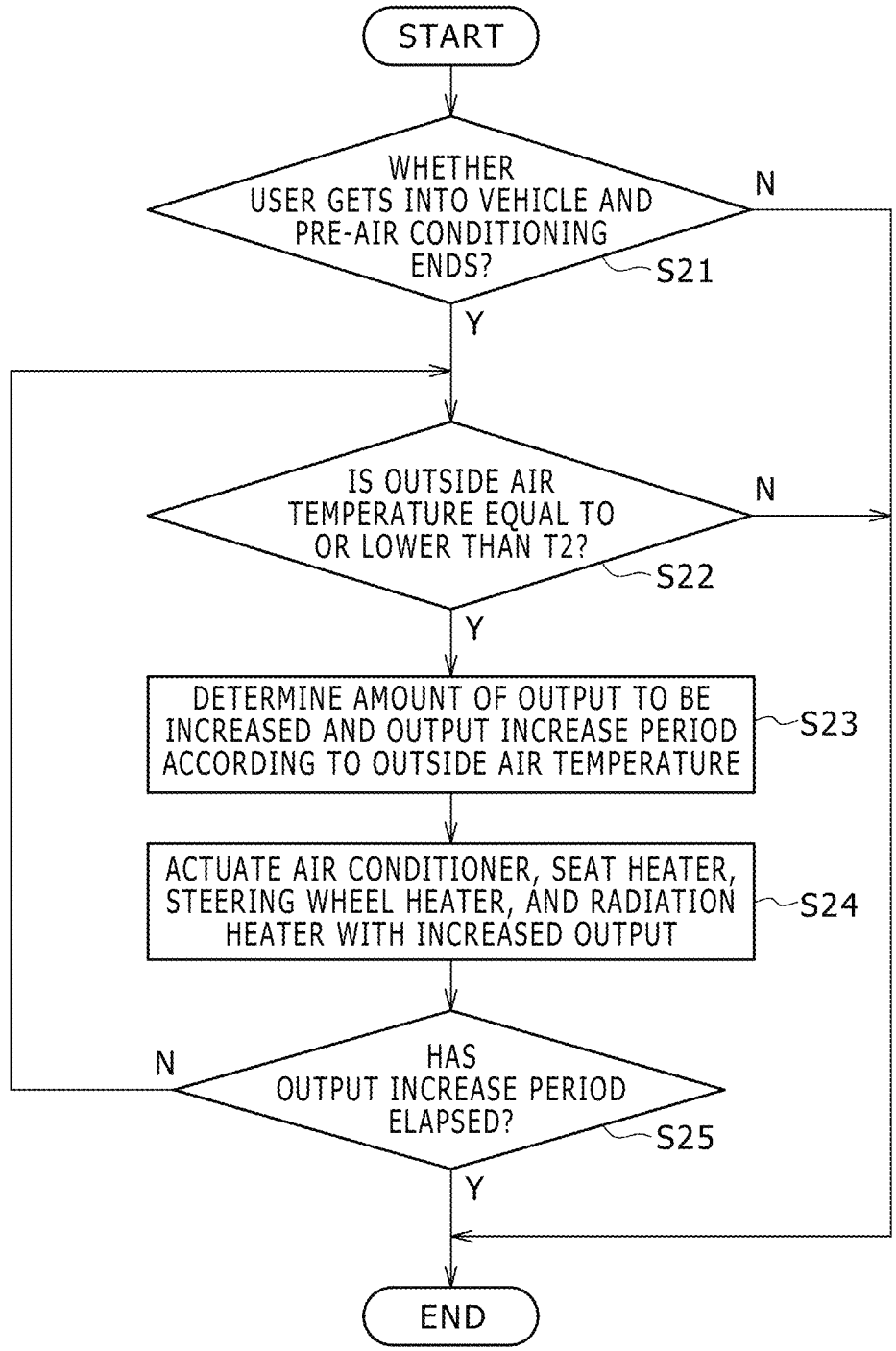
FIG. 10 is a flowchart illustrating an operation flow of the vehicular air conditioning system during heating.
Figure 11:
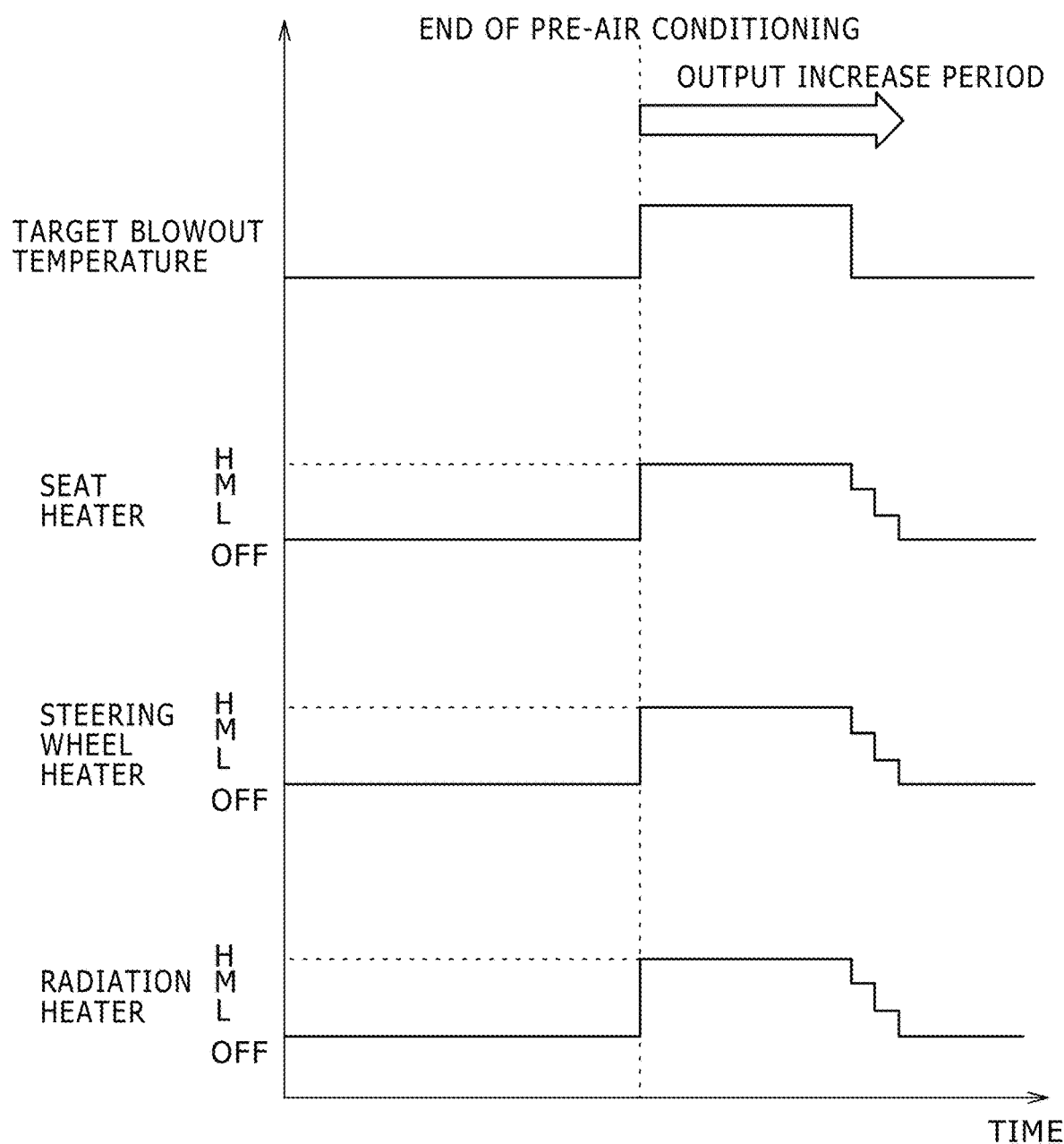
FIG. 11 is a time chart illustrating the operation flow of the vehicular air conditioning system during heating.

Using FIGS. 10 and 11, a description will be given of an operation flow of the vehicular air conditioning system 10 during heating.

In Step S21, the processor 41 checks whether the user gets into the vehicle 5 and the pre-air conditioning ends. When the pre-air conditioning ends, the process proceeds to Step S22. In Step S22, the processor acquires an outside air temperature from the outside air temperature sensor 11, and checks whether the outside air temperature is equal to or lower than the second predetermined temperature T2. When the outside air temperature is equal to or lower than the second predetermined temperature T2, the process proceeds to Step S23.

In Step S23, the processor determines the amount of output to be increased and the output increase period according to the outside air temperature. In Step S24, the processor air conditions the vehicle cabin 6 by actuating the air conditioner 20, the seat heater 32, the steering wheel heater 33, and the radiation heater 34, with an air conditioning output to which the amount of output to be increased has been added. The outputs of the seat heater 32, the steering wheel heater 33, and the radiation heater 34 may be set at the maximum level. In Step S25, when the output increase period elapses after the pre-air conditioning ends, the processor transitions to normal air conditioning control. The outputs of the seat heater 32, the steering wheel heater 33, and the radiation heater 34 may be reduced in a stepwise fashion.

Note that this disclosure is not limited to the above embodiment and the variations thereof, and needless to say, various modifications and changes can be made within the scope of the contents of the claims of this application.

The invention claimed is:

1. An air conditioning system for a vehicle that air conditions a vehicle cabin before a user gets into a vehicle, the air conditioning system comprising:
   an air conditioner configured to air condition the vehicle cabin;
   an outside air temperature sensor configured to detect outside air temperature of outside air;
   an inside air temperature sensor configured to detect inside air temperature of inside air of the vehicle cabin;
   a solar radiation sensor configured to detect solar radiation;
   an inside/outside switching door configured to switch air to be introduced between the inside air and the outside air; and
   a processor configured to actuate the air conditioner to air condition the vehicle cabin by increasing an air conditioning output for an output increase period after the user gets into the vehicle, wherein
   the air conditioning output includes a target blowout port temperature of the air conditioner and a target air volume flow of the air conditioner, and
   the processor is configured to calculate the target blowout port temperature, the target air volume flow, and a target opening amount of the inside/outside switching door based on the outside air temperature, the inside air temperature of the inside air, and the solar radiation, wherein
   the processor is configured to
   acquire the outside air temperature from the outside air temperature sensor, and
   in response to the acquired outside air temperature being equal to or higher than a first predetermined temperature,
     determine, based on the outside air temperature, an amount of the air conditioning output to be increased and the output increase period,
     correct, based on an amount of the solar radiation detected by the solar radiation sensor, the output increase period, and
     air condition the vehicle cabin by actuating the air conditioner with the determined amount of the air conditioning output to be increased and the corrected output increase period.

2. The air conditioning system for a vehicle according to claim 1, wherein
   the processor is configured to, in response to the outside air temperature acquired by the outside air temperature sensor being equal to or lower than a second predetermined temperature, actuate the air conditioner to air condition the vehicle cabin by increasing the air conditioning output for the corrected output increase period, the second predetermined temperature being lower than the first predetermined temperature.

3. The air conditioning system according to claim 2, further comprising:
an auxiliary air conditioner including:
a seat ventilator configured to blow air to the user who sits on a seat;
a seat heater configured to heat the seat;
a steering wheel heater configured to heat a steering wheel; and
a radiation heater configured to radiate radiation heat in the vehicle cabin.

4. The air conditioning system according to claim 1, further comprising:
an auxiliary air conditioner including:
a seat ventilator configured to blow air to the user who sits on a seat;
a seat heater configured to heat the seat;
a steering wheel heater configured to heat a steering wheel; and
a radiation heater configured to radiate radiation heat in the vehicle cabin.

5. The air conditioning system according to claim 4, wherein
the processor is configured to, in response to the outside air temperature acquired by the outside air temperature sensor being equal to or lower than a second predetermined temperature, the second predetermined temperature being lower than the first predetermined temperature,
determine, based on the outside air temperature, the amount of the air conditioning output to be increased and the output increase period, and
air condition the vehicle cabin by actuating the air conditioner, the seat heater, the steering wheel heater, and the radiation heater with the determined amount of the air conditioning output to be increased and the output increase period.

6. The air conditioning system according to claim 5, wherein
the processor is configured to, in response to the outside air temperature acquired by the outside air temperature sensor being equal to or higher than the first predetermined temperature, air condition the vehicle cabin by actuating the air conditioner and the seat ventilator with the determined amount of the air conditioning output to be increased and the corrected output increase period.

* * * * *